United States Patent
Kohl et al.

(10) Patent No.: US 7,401,855 B2
(45) Date of Patent: Jul. 22, 2008

(54) SEAT WITH ERGOMECHANICS

(75) Inventors: Josef Kohl, Hirschau (DE); Hermann Meiller, Wernberg-Köblitz (DE)

(73) Assignee: Grammer AG, Amberg (DE)

( * ) Notice: Subject to any disclaimer, the term of this patent is extended or adjusted under 35 U.S.C. 154(b) by 276 days.

(21) Appl. No.: 11/226,705

(22) Filed: Sep. 14, 2005

(65) Prior Publication Data

US 2006/0061169 A1    Mar. 23, 2006

(30) Foreign Application Priority Data

Sep. 17, 2004   (DE) .................. 10 2004 045 573

(51) Int. Cl.
*A47C 7/02* (2006.01)
*A47C 7/14* (2006.01)

(52) U.S. Cl. .............. 297/284.1; 297/284.2; 297/284.4; 297/284.9

(58) Field of Classification Search .............. 297/284.1, 297/284.2, 284.4, 284.9
See application file for complete search history.

(56) References Cited

U.S. PATENT DOCUMENTS

| 3,762,769 | A | 10/1973 | Poschl ................. 297/284 |
| 7,118,176 | B2 * | 10/2006 | Erker ................. 297/284.1 |
| 7,232,174 | B1 * | 6/2007 | Trott ................. 297/284.9 X |
| 2006/0178603 | A1 * | 8/2006 | Popescu ............. 297/284.4 X |
| 2006/0250008 | A1 * | 11/2006 | Kohl et al. ............ 297/284.9 |
| 2007/0080570 | A1 * | 4/2007 | Kohl et al. ............ 297/284.4 |

FOREIGN PATENT DOCUMENTS

| DE | 1824237 | 12/1960 |
| DE | 2064419 | 7/1972 |
| DE | 19714576 | 10/1998 |
| DE | 10152561 | 5/2003 |
| DE | 10238240 | 3/2004 |
| EP | 0754590 | 1/1997 |
| WO | WO2004020243 | 3/2004 |

* cited by examiner

*Primary Examiner*—Rodney B. White
(74) *Attorney, Agent, or Firm*—Needle & Rosenberg, P.C.

(57) ABSTRACT

A seat with a backrest and sitting surface, in particular for motor vehicles, wherein the backrest comprises a backrest frame and, disposed between it, elements forming an S-shaped backrest with a shoulder area that can be reconfigured in the forwards and backwards directions, and a lumbar spine area that can be reconfigured in the forwards and backwards directions, wherein the elements are swivel-mounted to rotate about an imaginary or real axis extending horizontally between the shoulder and lumbar spine areas and running through the backrest frame or parallel with it in such a way that, without changing an existing inclination setting of the backrest relative to the sitting surface, a reconfiguration of the lumbar area and/or the shoulder area in the forwards direction can be made automatically by reconfiguring the shoulder area and/or the lumbar area in the backwards direction.

14 Claims, 9 Drawing Sheets

SEAT WITH ERGOMECHANICS

This application claims priority to German Application No. 10 2004 045 573.2, filed Sep. 17, 2004, which is herein incorporated by reference.

The invention relates to a seat with backrest and sitting surface, in particular for motor vehicles, wherein the backrest comprises a backrest frame and, disposed between it, elements forming an S-shaped backrest with a shoulder area that can be reconfigured in the forwards and backwards directions, and a lumbar spine area that can be reconfigured in the forwards and backwards directions, in accordance with the preamble of claim 1.

Seats with reconfigurable backrests are known in diverse ways. For example, conventional automobiles and heavy goods vehicles have seats equipped with an adjustable lumbar support in the area of the lumbar spine of a person using the vehicle seat. Lumbar supports of this kind can be adjusted in both the forwards and backwards directions in order to make available to the person, as a result of a convex-type reconfiguration of the backrest in the area of the lumbar spine, a support of greater or lesser intensity, depending on the degree to which he/she has a hollow back, to increase his/her sitting comfort. The reconfiguration of lumbar spine supports of this kind is pre-set by the person, and they remain in this shape until the person adjusts this setting, e.g. by operating a handwheel. This requires the use of at least one hand, which is frequently unavailable when the vehicle is in motion.

In addition, vehicle seats are often of a kind such that they are designed for an average size of the person using them in their ideal shape, i.e. viewed in the direction of travel, they exhibit a concave shaped shoulder area and a convex shaped lumbar area, to create an S-shape for the backrest, which is matched to the shape of the spine of an average sized person.

The result of this is that persons of an above- or below-average size experience a lower degree of sitting comfort in vehicle seats of this kind.

Moreover, drivers, especially of heavy goods vehicles, spend up to 10 hours a day in a driver's seat in a relatively rigid sitting position, owing to their secure grip on the steering wheel with their hands, the position of their feet on the pedals and their forwards-directed gaze. Sitting in this position is not just tiring, it is also damaging to health owing to the sustained stress on a few groups of muscles. Changing the sitting position, e.g. by adjusting the lumbar support or by height adjustment of the backrest if this facility is available, requires the use of the hands to operate a manually operated or electronic adjusting device, which has a negative effect in impairing safety while driving.

Seats are also known wherein the backrest is set in its S-shape by inclining the backrest backwards, resulting in a change in the direction of view of the person using the seat, and an undesirable change taking place in the angle between the upper and lower parts of the person's body.

Accordingly, the object of the present invention is to make available a seat, in particular for vehicles, with a backrest providing a high degree of sitting comfort for persons of different sizes, the shoulder and lumbar areas of which can be changed in shape, thereby making it possible to change the sitting position of the person's back, without the intervention of operating components and without using the hands of the person occupying the seat.

This object is achieved by the features of claim 1.

One important point of the invention lies in the fact that, in the case of a seat with backrest and sitting surface, in particular for vehicles, wherein the backrest comprises a backrest frame and, disposed between this, elements forming an S-shaped backrest with a shoulder area that can be reconfigured in the forwards and backwards directions, and a lumbar spine area that can be reconfigured in the forwards and backwards directions, the elements are swivel-mounted to rotate about an imaginary or real axis extending horizontally between the shoulder and lumbar spine areas and running through the frame or parallel with it in such a way that, without changing an existing inclination setting of the backrest relative to the sitting surface, a reconfiguration of the lumbar area and/or the shoulder area in the forwards direction can be made automatically by reconfiguring the shoulder area and/or the lumbar area in the backwards direction. Consequently, the driver of a vehicle can, by exerting pressure from his shoulders, obtain, for example, an inwardly-directed greater curvature of the shoulder area of the backrest and, simultaneously, an outwardly—forwards in the direction of travel—directed greater curvature of the lumbar area of the backrest. An opposed movement or reconfiguration of the S-shaped backrest can be achieved by a backwards-directed exertion of pressure by the person's lumbar spine in the lumbar area of the backrest, as a result of which the lumbar area assumes a less forwards-directed curvature, while simultaneously, in the shoulder area of the backrest, a less backwards-directed curvature takes shape.

In this manner, by shifting the weight in the person's upper body area, an amended curvature of the backrest contour can be maintained, leading to a new, supported spinal curvature of the person.

Since a change in the backrest contour curvature of this kind can be maintained in a simple manner by shifting the weight in the upper body area, this can also be undertaken just as frequently when the vehicle is in motion, as a result of which, owing to the frequent movement, damage to discs can be avoided and stress relief afforded to muscle groups subject to long-term loading. By continuously changing the spinal curvature thereby obtained, it is even possible to obtain a massage effect.

The elements preferably comprise at least one S-shaped rod extending in the longitudinal direction of the backrest, the top and bottom ends of this rod being swivel-mounted on the backrest frame to rotate about axes aligned in the longitudinal direction of the backrest. If at least two S-shaped rods of this kind are arranged, they are synchronized in their swiveling motions by a connecting element, wherein the connecting element is preferably designed as a synchronization linkage, which is pivot-hinge connected to both rods.

The S-shaped rods, which are covered with a flexible, panel-type element to support the backrest upholstery, can be swiveled through an angle of 90° maximum for stepless alteration of arcs in the S-shape of the backrest or for setting a backrest extending in one plane in the longitudinal direction. Accordingly, a backrest that is completely flat in the longitudinal direction is obtained when the rods are swiveled into a position in which their two-dimensional S-shape is aligned in the latitudinal direction of the backrest.

Conversely, an S-shaped backrest with strong curvatures in the shoulder and lumbar areas is obtained when the S-shape of the rods is aligned in the longitudinal direction of the vehicle seat, i.e. turned through 90°. Between these two extreme swivel positions of the rods, any desired curvature can be steplessly set in the shoulder and lumbar areas of the backrest by twisting the rods.

In accordance with a preferred embodiment, the rods are equipped with a first arresting device to arrest the rods in a selected swivel position. An arresting device of this kind comprises a linkage pivot-hinge connected to both rods and essentially extending horizontally, and a spring encompassing the linkage in spiral form, wherein the spring is connected to the backrest frame, and its ends can be twisted radially relative to one another in order to change the inside diameter. When the spring is opened and closed, the spring is clamped more or less strongly to the surface of the linkage with a preferably circular cross-section. This has the result that, owing to the strong friction forces between the inside of the spring and the linkage, a braking effect or even an arresting of the rods in their swiveling motion is obtained.

In accordance with a further preferred embodiment, the elements may comprise at least three panel elements extending in the latitudinal direction of the backrest, which are connected together by means of a horizontally aligned pivoting bearing in the lower lumbar-spine area and one in the upper shoulder area. Here, the real axis is connected to the central panel disposed between the pivoting bearings. The use of panels instead of S-shaped rods renders the additional use of a flexible panel-type cover unnecessary.

The embodiment of the invention with at least three panels may, additionally, be equipped with a second arresting device to arrest the real axis in its rotary motion relative to the backrest frame and/or the central panel, so that, as a result, the desired S-shape of the backrest can be permanently set. This enables, for example, a desired, forwards-facing strong curvature of the backrest in the lumbar-spine area, in order that a stronger pressure may be exerted by the backrest on the person's lumbar spine.

Owing to their swiveling motion around the pivoting bearing and the real axis, the three panels have, in their totality, an extension in the longitudinal direction of the backrest that differs in its degree. This requires sliding bearings secured to the backrest frame at the lower end of the bottom panel and at the upper end of the top panel for sliding support of the top and bottom panels relative to the backrest frame during any change to the S-shape of the backrest resulting from the swiveling of the panels.

In accordance with a further preferred embodiment, the elements comprise at least one upper and one lower gas pocket, disposed above and below the imaginary axis. The gas pockets are connected together by means of a pressure-regulating valve for the exchange of gas, so that, when the upper gas pocket is subjected to a loading by the shoulders of the person, gas flows into the other gas pocket, wherein the resultant change in the shoulder and lumbar areas of the backrest may be varied in speed by means of the pressure-regulating valve. The pressure-regulating valve may also be used for the avoidance of gas exchange between the two gas pockets, so that a permanent S-shape of the backrest is obtained.

Further advantageous embodiments are contained in the dependent claims.

The advantages and functionalities are contained in the following descriptions in conjunction with the drawings.

Figure 1:
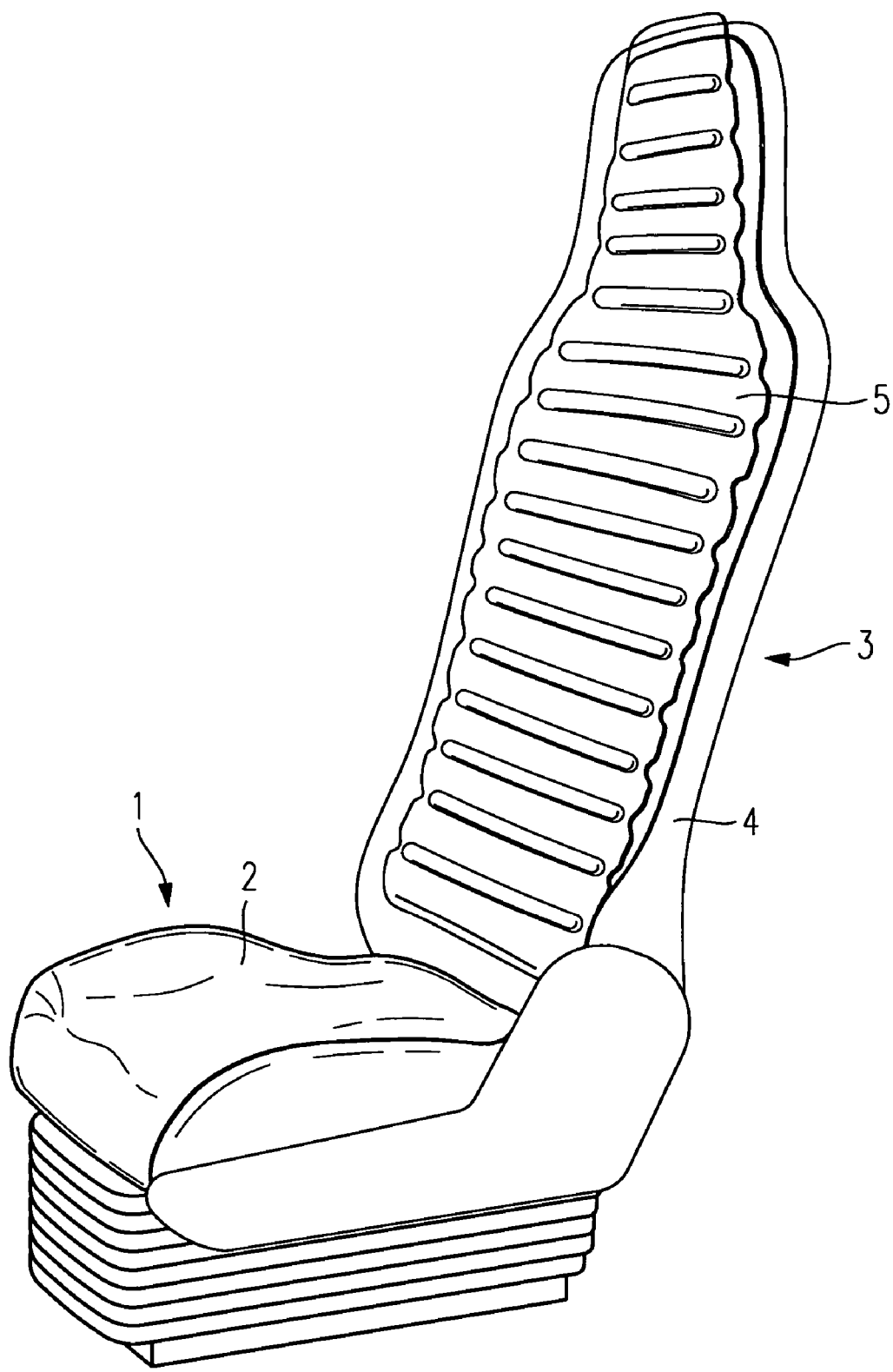
FIG. 1 shows a schematic perspective view of a vehicle seat with straight backrest in accordance with a first embodiment of the invention.

FIG. 1 shows, in a schematic perspective view, a vehicle seat with straight backrest in accordance with a first embodiment of the invention. The vehicle seat comprises a sitting surface with a cushioned section 2 and a backrest 3 with a backrest frame 4.

Disposed between the backrest frame is a flexible, panel-type element 5 with cutouts running in the horizontal direction to provide support for rods located behind it. The backrest upholstery is not shown in this drawing.

Figure 2:
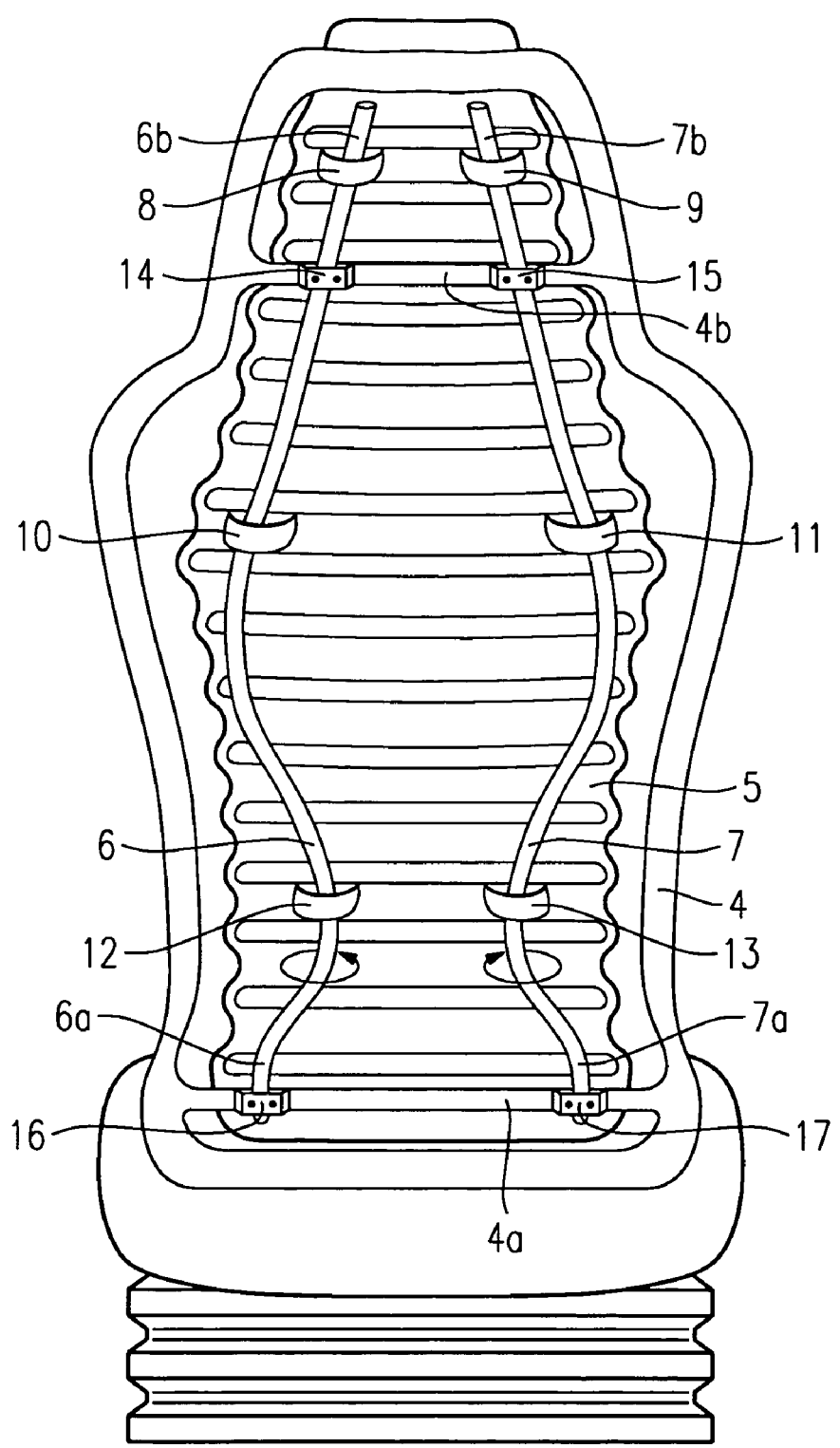
FIG. 2 shows, in a schematic rear view, the vehicle seat with straight backrest in accordance with the first embodiment of the invention.

FIG. 2 shows the vehicle seat in accordance with the first embodiment with straight backrest in a rear view. As can be seen from the drawing, secured to the backrest frame 4 are two essentially S-shaped rods 6, 7, disposed adjacent to one another, which are connected to the flexible, panel-type element 5 by means of loop-type connections 8, 9, 10, 11, 12, 13 or connecting elements having the same effect.

The S-shaped rods 6, 7 are, in the case of a straight backrest, disposed in such a way that their S-shapes extend in the opposed directions in the latitudinal direction of the backrest.

The rods 6, 7 are swivel-mounted at their lower ends 6a and 7a and their upper ends 6b and 7b by means of swivel bearings 14, 15, 16, 17 on horizontally running backrest frame components 4a and 4b in such a way that they can be rotated by an angle of 90° maximum about an axis running essentially in the longitudinal direction of the backrest and the backrest frame 4.

Figure 3:
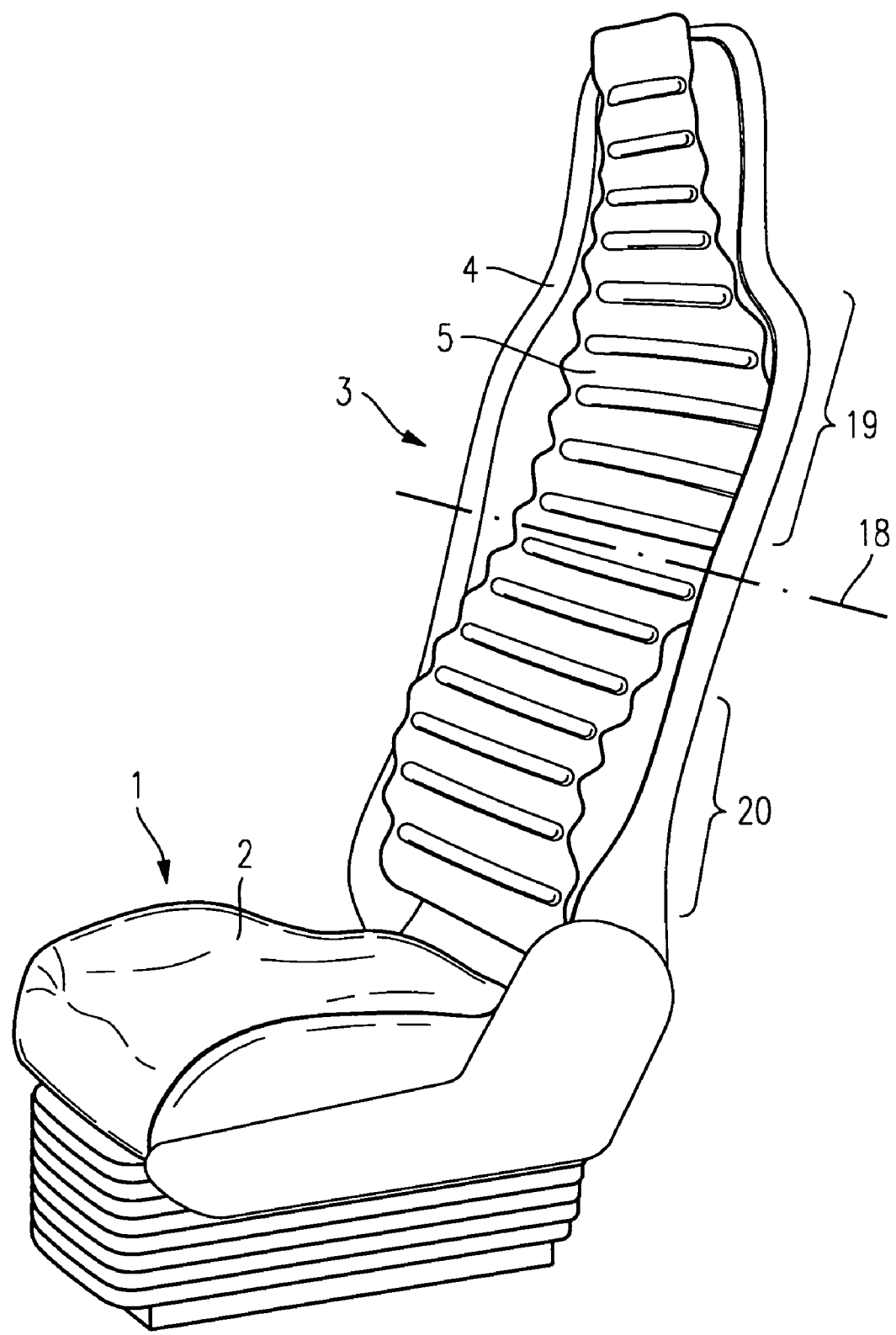
FIG. 3 shows, in a schematic perspective view, the vehicle seat with reconfigured backrest in accordance with the first embodiment of the invention.
Figure 4:
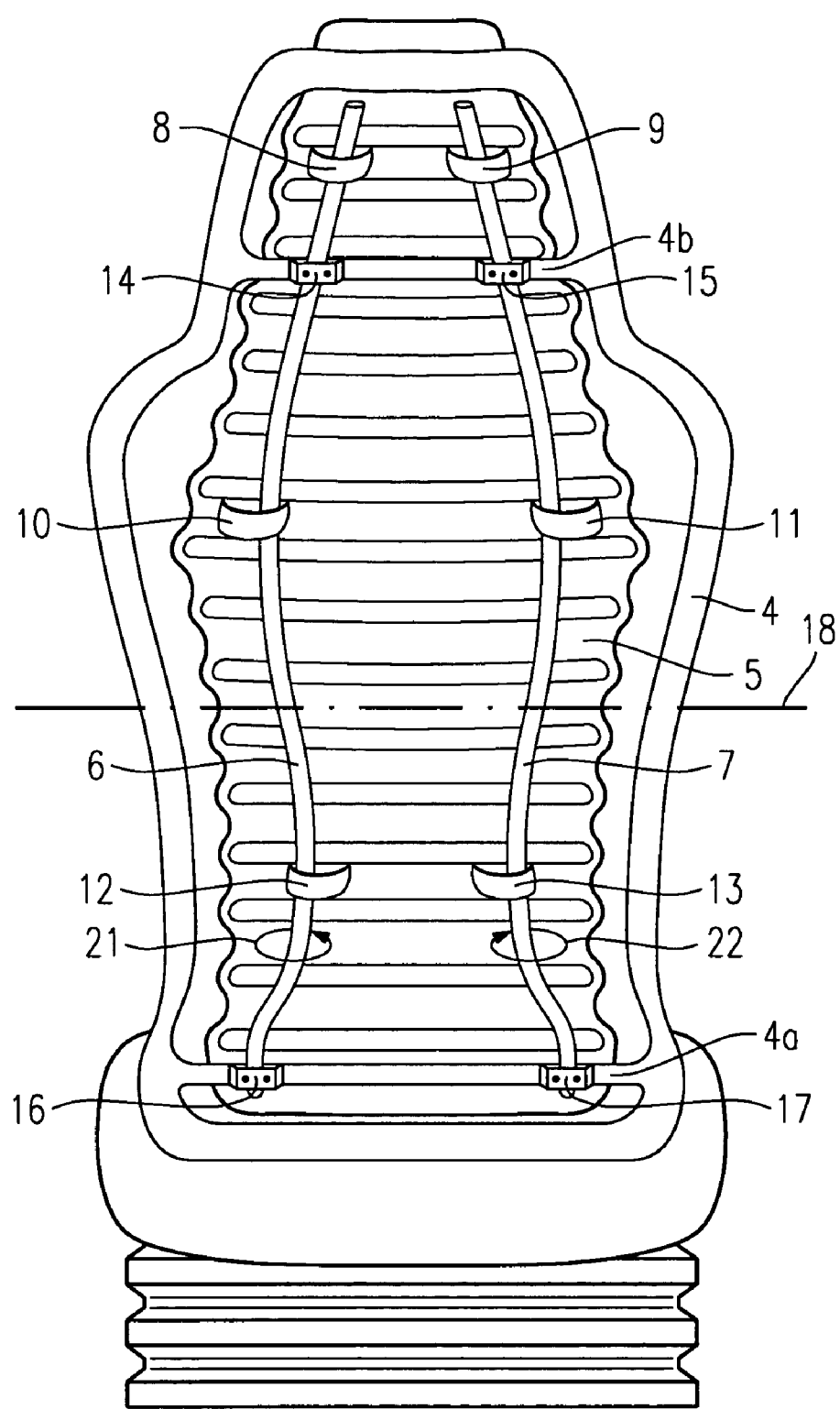
FIG. 4 shows, in a schematic rear view, the vehicle seat with reconfigured backrest in accordance with the first embodiment of the invention.

FIG. 3 shows, in a schematic perspective drawing, the vehicle seat with reconfigured backrest in accordance with the first embodiment of the invention. It can be clearly seen in this drawing that the flexible, panel-type element 5 has an S-shape, which comprises a concavity 19 in the shoulder area facing backwards from the vehicle direction, and a forwards-facing convexity in the lumbar spine area 20. When viewed together with the schematic rear view of the vehicle seat with reconfigured backrest shown in FIG. 4, it becomes clear that, by rotating the rods 6, 7 about the imaginary axes running in the longitudinal direction of the backrest, as indicated by arrows 21 and 22, the S-shape of the rods changes from an alignment extending in the latitudinal direction of the backrest to an alignment facing forwards relative to the vehicle seat. A change of this kind can take place steplessly, and causes a swiveling motion of the flexible, panel-type element about an imaginary swivel axis 18, which is located between the lumbar spine area and the shoulder area at a level proved to be suitable for differing spine lengths.

By twisting the rods 6, 7, a backwards-facing concavity in the shoulder area and a forwards-facing convexity in the lumbar spine area are achieved to a greater or lesser extent depending on the size of the rotation angle. This rotation takes place exclusively by means of a deliberate pressure by the person with his/her shoulders or lumbar spine against the backrest. As soon as the backrest shape appropriate to the shape of the user's spine has been accomplished by the twisting of the rods, the maximum sitting comfort for the person is achieved. An automatic matching of the backrest to the shape of the person's spine thereby takes place without having to use complicated mechanisms to reconfigure the backrest by swinging it backwards or forwards and/or by shifting the sitting surface. The driver can deliberately change the shape of his/her spinal column to initiate a new sitting position while driving, just by exerting pressure on the backrest with his/her spine in the shoulder and/or lumbar regions, and thereby experiences an automatic matching of the backrest shape to his/her new sitting position and spinal column shape along with maximum sitting comfort.

Figure 5:
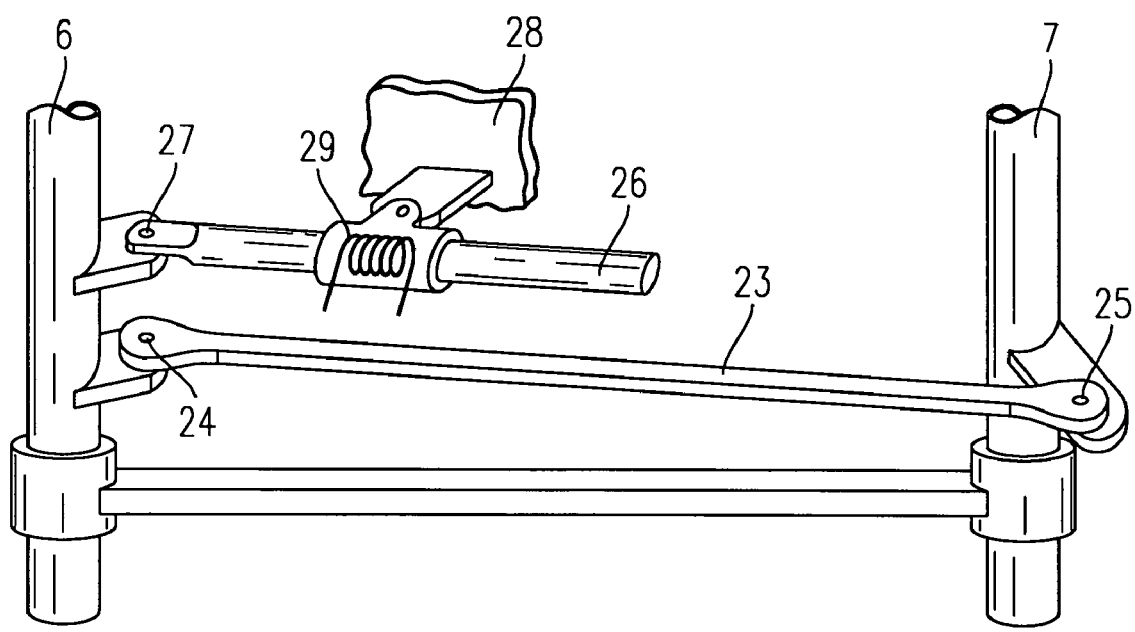
FIG. 5 shows a schematic cutout view of connecting and arresting elements for the vehicle seat in accordance with the first embodiment.

FIG. 5 shows, in a schematic cutout drawing, connecting and arresting elements for the vehicle seat in accordance with the first embodiment of the invention. Disposed as a connecting element for coordination of the rotary motions of the rods 6, 7 is a synchronization linkage 23 with pivoting bearings 24 and 25, wherein the pivoting bearings 24, 25 are secured to the rods 6, 7 in opposition in such a way that the rods 6, 7 synchronously execute an opposed rotary motion. It is thereby ensured that the backrest simultaneously reconfigures itself equally in both the left-hand and right-hand halves.

A linkage 26 running essentially horizontally, only half of which is shown here, is connected to both rods 6, 7 and serves, in conjunction with a spiral-shaped spring 29, as an arresting or braking device for the rotary motion to be executed by the rods. To this end, the linkage 26 is secured, by means of the pivoting bearing 27, to the rod 6 and likewise to the rod 7 (not shown).

The spring 29 encompasses the linkage 26 with a circular cross-section and is secured by means of a mounting 28 to the backrest frame, which is not shown here. The spiral spring 29 may be opened and closed at its ends to increase its inside diameter, so the rigidity of clamping of the rod 26 by the spiral spring 29 varies to a greater or lesser extent. This gives rise to greater or lesser friction between the surface of the rod 26 and the internal surfaces of the spiral spring 29, leading to a braking or even an arresting effect. In this manner, the rods 6, 7 can be fixed in their momentaneous rotational position. This enables the driver deliberately to set a reconfiguration of the backrest that is opposed to the loading on the backrest usually exerted by his/her spinal column, involving, for example, a forwards-directed curvature of the lumbar area to the desired degree.

Figure 6:
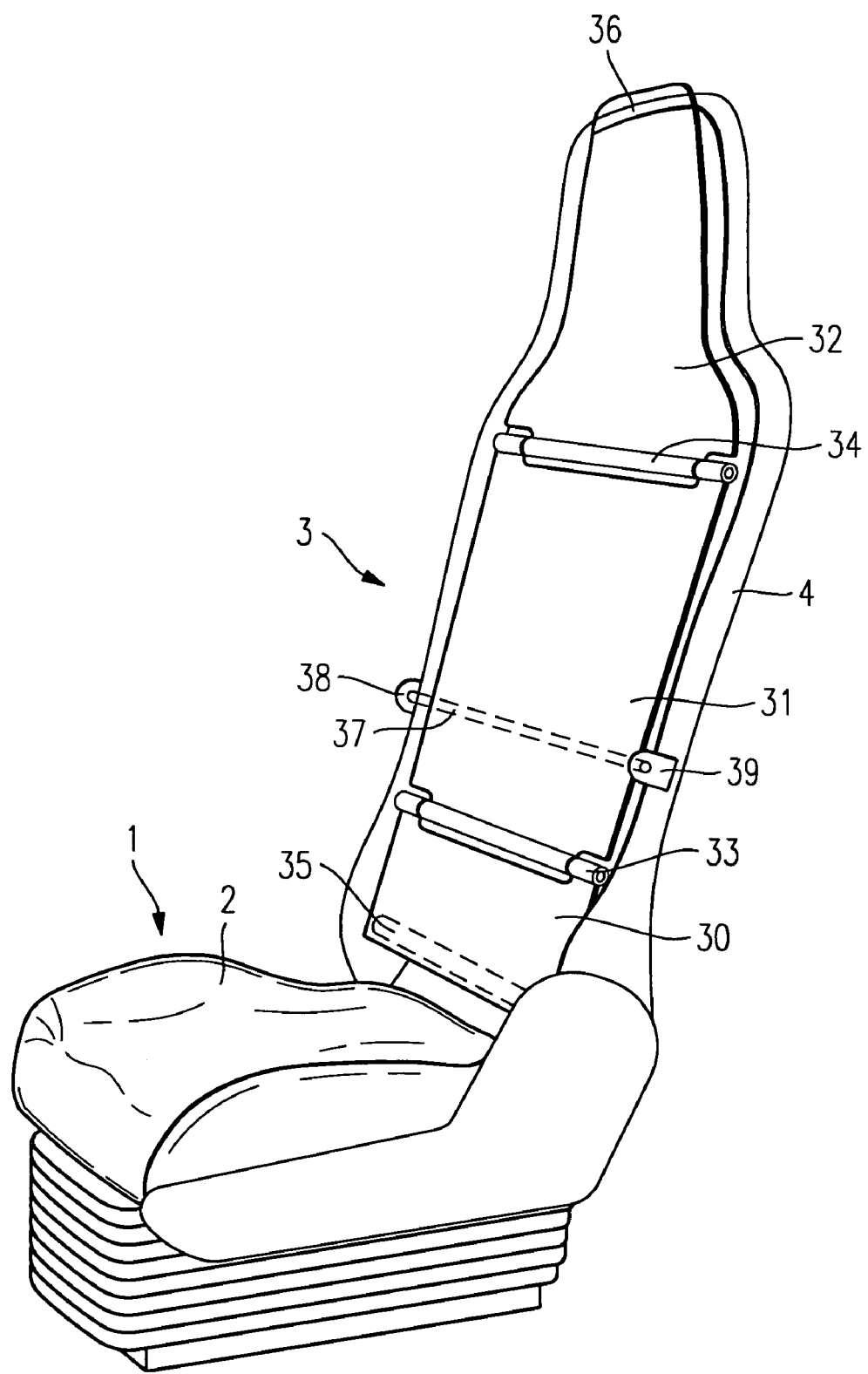
FIG. 6 shows, in a schematic perspective view, a vehicle seat with a straight backrest in accordance with a second embodiment of the invention.

FIG. 6 shows, in a schematic perspective drawing, a vehicle seat with a straight backrest in accordance with a second embodiment of the invention. As can be seen in this drawing, the backrest, which is shown without its upholstery, comprises a total of three panels 30, 31 and 32, which are connected together by means of pivoting bearings 33 and 34.

Sliding bearings 35 and 36 are disposed at the lower end of the lower panel 30 and at the upper end of the upper panel 32 opposing the backrest frame 4, so that a sliding motion of the upper and lower panels 30, 32 relative to the backrest frame 4 may be executed when the lower and upper panels 30, 32 are swiveled.

A real axis 37 is connected to the central panel 31 and rotation-mounted in frame components 38, 39 secured to the backrest frame 4 on the right- and left-hand sides.

Figure 7:
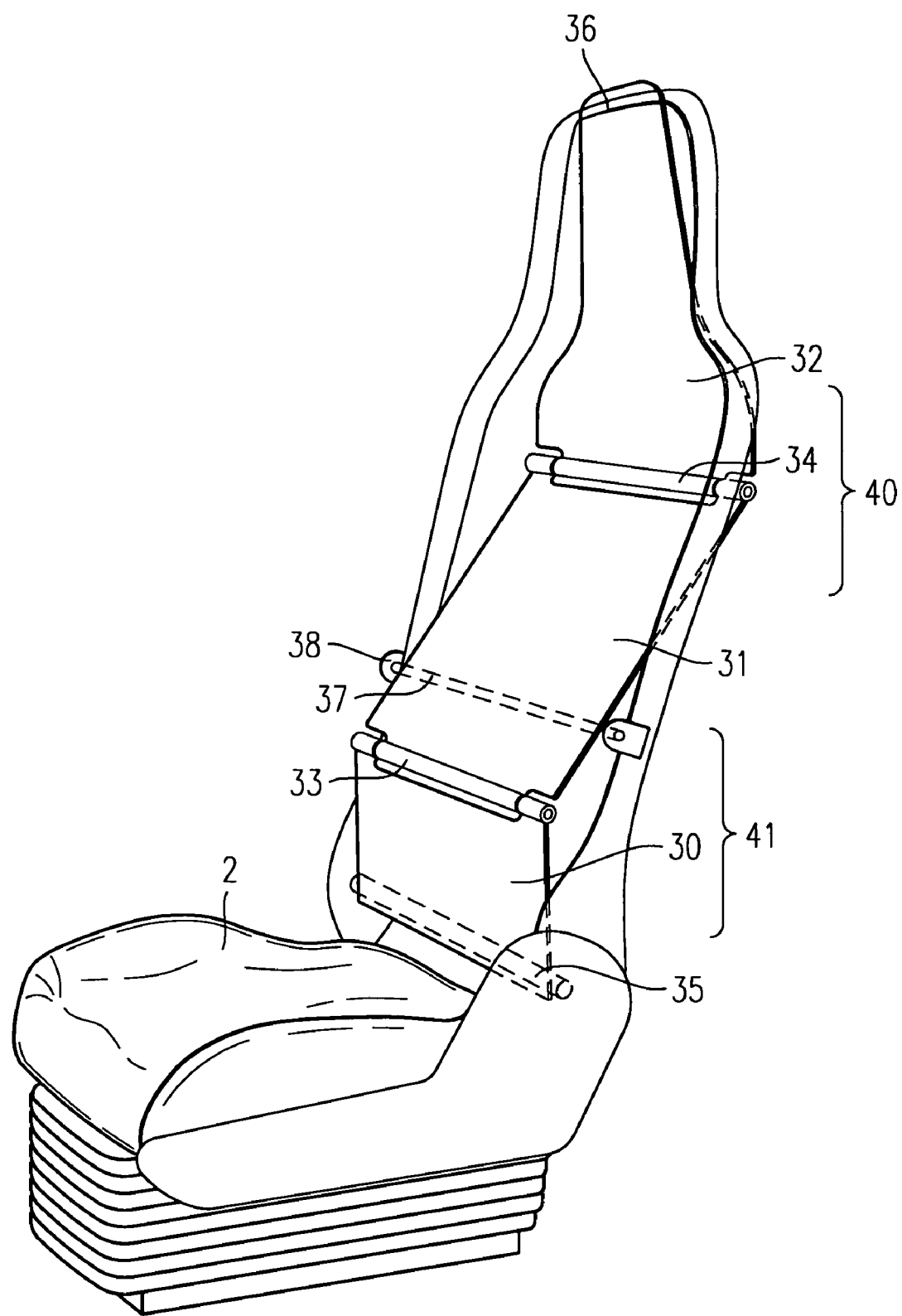
FIG. 7 shows, in a schematic perspective view, the vehicle seat with reconfigured backrest in accordance with the second embodiment of the invention.

FIG. 7 shows the vehicle seat in accordance with the second embodiment with reconfigured backrest. When a reconfiguration of the backrest takes place, initiated by a pressure motion of the back of the user in his/her shoulder and/or lumbar region, a backwards-facing reconfiguration takes place in the shoulder region 40 and a forwards-facing reconfiguration in the lumbar region 41. This can be clearly seen in FIG. 7. To this end, a swivel movement of panels 30, 31, 32 around the real axis 37 takes place.

A swivel movement of this kind by panels 30-32 causes a shifting of the lower and upper panels 30, 32 relative to the backrest frame 4 in sliding bearings 35 and 36.

Figure 8:
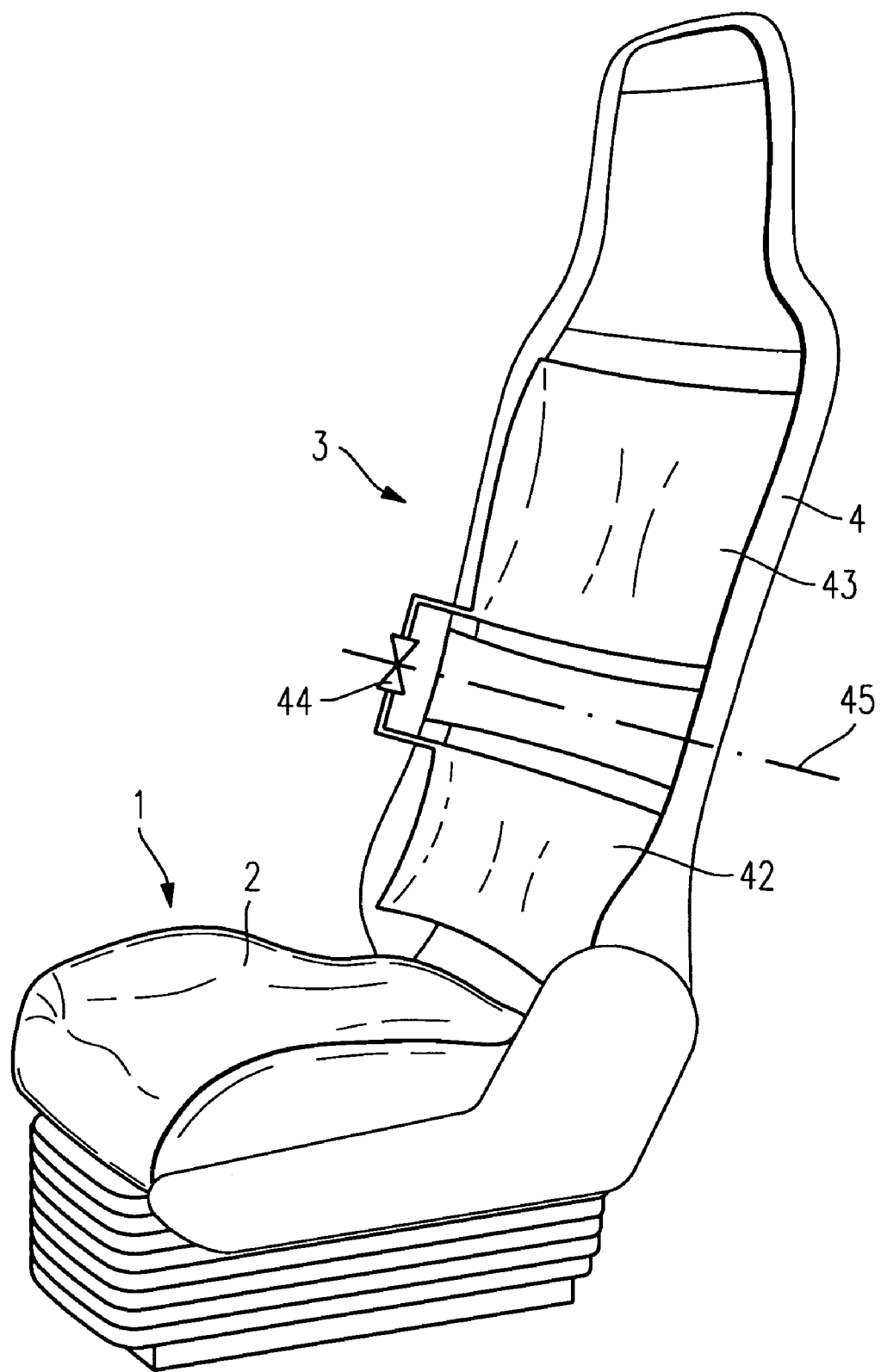
FIG. 8 shows, in a schematic perspective view, a vehicle seat with virtually straight backrest in accordance with a third embodiment of the invention.

FIG. 8 shows, in a schematic perspective drawing, a vehicle seat with straight backrest in accordance with a third embodiment of the invention. The vehicle seat 1, with the cushioned section 2 and the backrest 3, is equipped with a lower gas pocket or air cushion 42 and an upper gas pocket or air cushion 43. The two gas pockets are joined together by means of a pressure-regulating valve 44 and a connecting line.

Figure 9:
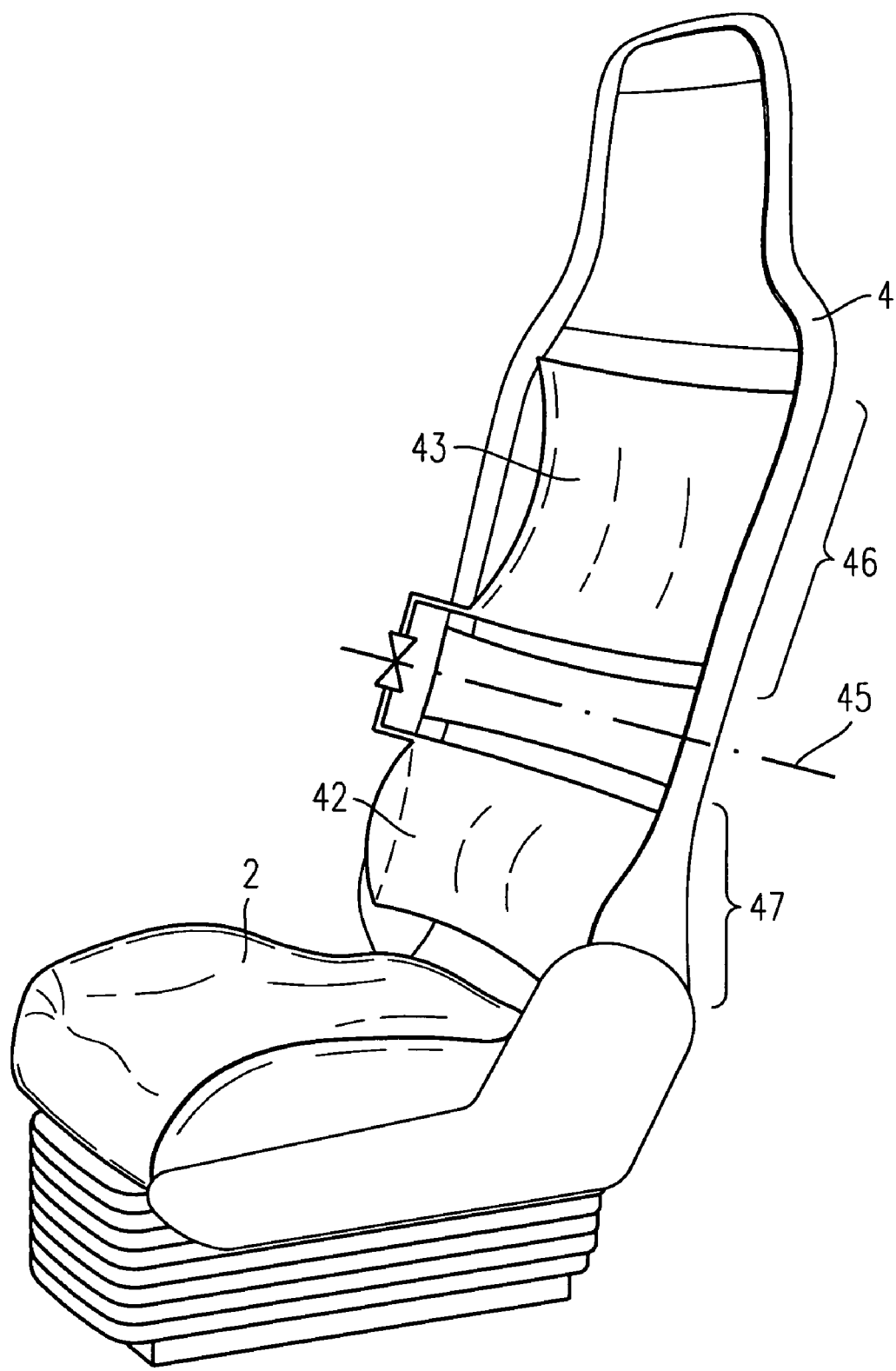
FIG. 9 shows, in a schematic perspective view, the vehicle seat with reconfigured backrest in accordance with the third embodiment of the invention.

As can clearly be seen in FIG. 9, a relocation of air takes place relative to the imaginary axis 45 from the upper air cushion 43 into the lower air cushion 42, to form a backward concavity in the shoulder area 46 of the backrest and a forward convexity 47 in the lumbar area. This is achieved by exerting pressure on the backrest in the shoulder area 46 with the user's shoulder. As soon as a desired convexity and/or concavity state is achieved, this state can be fixed by means of the pressure-regulating valve 44.

Owing to their gas properties, air cushions of this kind advantageously provide the maximum sitting comfort.

All features disclosed in the application documents are claimed as being essential for the invention to the extent that, individually or in combination, they are novel relative to the prior art.

LIST OF REFERENCE NUMBERS

| | |
|---|---|
| 1 | Sitting surface |
| 2 | Cushioned section |
| 3 | Backrest |
| 4 | Backrest frame |
| 4a, 4b | Horizontal sections of the backrest frame |
| 5 | Flexible panel-type element |
| 6, 7 | Rods |
| 6a, 7a | Lower ends of rods |
| 6b, 7b | Upper ends of rods |
| 8, 9, 10, 11, 12, 13 | Connecting elements between rods and flexible element |
| 14, 15, 16, 17 | Swivel bearing |
| 18 | Imaginary axis |
| 19, 40, 46 | Shoulder area |
| 20, 41, 47 | Lumbar area |
| 21, 22 | Direction of rotation of rods |
| 23 | Synchronization linkage |
| 24, 25 | Pivoting connections |
| 26 | Arresting linkage |
| 27 | Pivoting connection |
| 28 | Backrest frame mounting |
| 29 | Spiral spring |
| 30, 31, 32 | Panels |
| 33, 34 | Pivoting bearings |
| 35, 36 | Sliding bearings |
| 37 | Real axis |
| 38, 39 | Axial bearings |
| 42, 43 | Gas pockets |
| 44 | Pressure-regulating valve |
| 45 | Imaginary axis |

The invention claimed is:

1. Seat with backrest and sitting surface, in particular for motor vehicles, wherein the backrest comprises a backrest frame and, disposed between said frame, elements forming an S-shaped backrest comprising a shoulder area that can be reconfigured in the forwards and backwards directions and a lumbar spine area that can be reconfigured in the forwards and backwards directions, wherein the elements are swivel-mounted to rotate about an axis extending horizontally in a latitudinal direction of the backrest frame between the shoulder and lumbar spine areas in such a way that, without changing an existing inclination setting of the backrest relative to the sitting surface, a reconfiguration of the lumbar area and/or the shoulder area in the forwards direction can be made automatically, respectively, by reconfiguring the shoulder area and/or the lumbar spine area in the backwards direction.

2. A seat as claimed in claim 1, wherein the elements forming the S-shaped backrest comprise at least one S-shaped rod extending in the longitudinal direction of the backrest, and comprising top and bottom ends which are swivel-mounted on the backrest frame to rotate about axes aligned in the longitudinal direction of the backrest.

3. A seat as claimed in claim 2, wherein the elements forming the S-shaped backrest comprise at least two S-shaped rods disposed adjacent to one another and extending in the longitudinal direction of the backrest, the rods being synchronized in swiveling motions by a connecting element.

4. A seat as claimed in claim 3, wherein the connecting element is a synchronization linkage, pivot-hinge connected to both rods.

5. A seat as claimed in claim 2, wherein the S-shaped rod(s) are adapted to be swiveled through an angle of 90° maximum for stepless alteration of arcs in the S-shape of the backrest and/or adapted to set the backrest extending in one plane in the longitudinal direction.

6. A seat as claimed in claim 2, wherein a first arresting device to arrest the rod(s) in a selected swivel position.

7. A seat as claimed in claim 6, wherein the first arresting device comprises a linkage pivot-hinge connected to both rods and essentially extending horizontally, and a spring encompassing the linkage in spiral form, which spring is connected to the backrest frame, and the ends of which can be twisted radially relative to one another in order to change the inside diameter.

8. A seat as claimed in claim 2, wherein the rod(s) is/are covered with a flexible, panel-type element to support the backrest upholstery.

9. A seat as claimed in claim 1, wherein the elements forming the S-shaped backrest comprise at least three panel elements extending in the latitudinal direction of the backrest, which are connected together by means of a lower horizontally aligned pivoting bearing arranged at the bottom in the lumbar-spine area and an upper horizontally aligned pivoting bearing arranged in the shoulder area.

10. A seat as claimed in claim 9, wherein the axis is a real axis is connected to the central one of the which is panel disposed between the pivoting bearings.

11. A seat as claimed in claim 10, wherein a second arresting device to arrest the real axis in its rotary motion relative to the backrest frame and/or the central panel.

12. A seat as claimed in claim 9, wherein sliding bearings secured to the backrest frame at the lower end of the bottom panel and at the upper end of the top panel for sliding support of the top and bottom panels relative to the backrest frame during any change to the S-shape of the backrest resulting from the swiveling of the panels.

13. A seat as claimed in claim 1, that wherein the elements forming the S-shaped backrest comprise at least one upper and one lower gas pocket, disposed above and below the axis, wherein the axis is an imaginary axis.

14. A seat as claimed in claim 13, wherein the gas pockets are connected together by means of a pressure-regulating valve.

* * * * *